Jan. 27, 1970   E. KALDIS ET AL   3,492,620
PHOTOSENSITIVE DEVICE
Filed Sept. 28, 1966
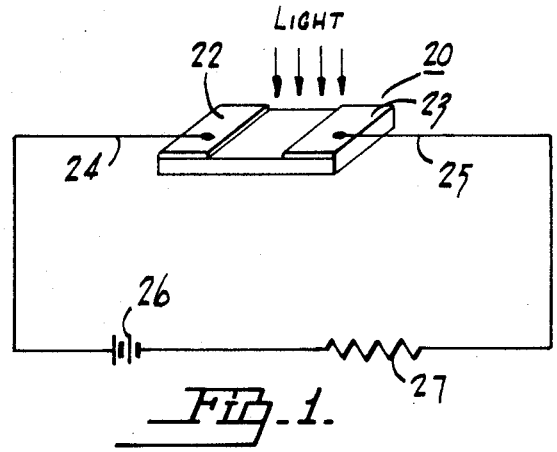
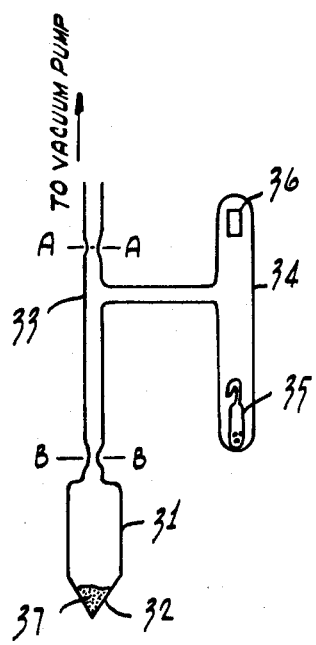
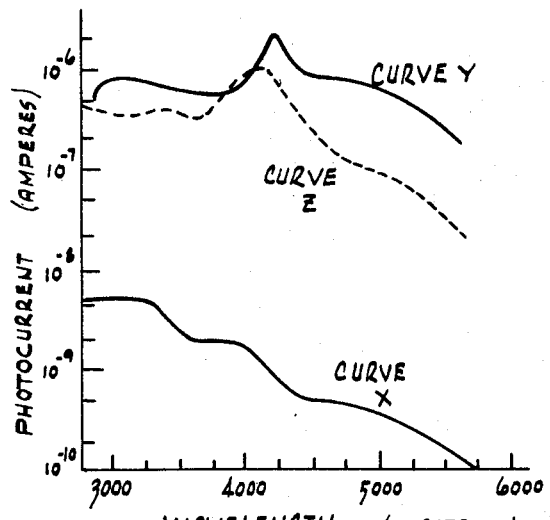
INVENTORS,
EMANUEL KALDIS &
ROLAND WIDMER
BY Glenn H. Bruestle
ATTORNEY

United States Patent Office 3,492,620
Patented Jan. 27, 1970

3,492,620
PHOTOSENSITIVE DEVICE
Emanuel Kaldis and Roland Widmer, Zurich, Switzerland, assignors to RCA Corporation, a corporation of Delaware
Filed Sept. 28, 1966, Ser. No. 582,558
Int. Cl. H01c 7/08; C01b 17/00, 19/00
U.S. Cl. 338—15                                              7 Claims

ABSTRACT OF THE DISCLOSURE

Bodies composed of various forms of $Cd_4SiS_6$ and $Cd_4SiSe_6$ are useful as photoconductive devices.

---

This invention relates to a novel photoconductive device which is useful, for example, in the measurement and detection of flame temperatures, in image converters or image detectors, or in phototubes.

Photosensitive devices are well known in the semiconductor arts. One type includes a body of photoconductive material, such as selenium, cadmium sulfide, or cadmium selenide, mounted between electrodes in ohmic contact therewith. Other devices, such as a vidicon tube, include a photoconductive body, a single electrode in ohmic contact therewith, and means for scanning the photoconductive body with an electron beam. While photoconductive devices presently in use have a multitude of appdications, they are either inefficient or insensitive in the near ultra-violet region of the spectrum, i.e., from 2000 A.–4000 A.

It is an object of this invention to provide a new and improved photoconductive device.

Another object is to provide a photoconductive device which is sensitive to ultra-violet light.

The novel photosensitive device comprises a body consisting essentially of $Cd_4SiS_6$ or $Cd_4SiSe_6$, and at least one electrode in ohmic contact therewith. Such devices are sensitive to light in the visible region of the spectrum.

In one arrangement the novel device includes a body of crystalline $Cd_4SiS_6$ prepared by reacting essentially stoichiometric quantities of cadmium sulfide or cadmium metal, elemental silicon and elemental sulfur in a closed essentially oxygen and moisture free reaction vessel. An atmosphere of elemental iodine is present in the reaction vessel, at least during the step of crystal growth. The iodine provides a transport medium for the growth of $Cd_4SiS_6$ crystals in the vessel. This novel device is an efficient ultra-violet sensitive photoconductive device having a photoresponse to wavelengths in the range from about 2000 A. to 4700 A.

The fundamental optical absorption edge of $Cd_4SiS_6$ is at about 4300 A. The efficient ultraviolet photoconductivity of the crystalline material, evidenced by an increase in photocurrent (corrected for equal numbers of photons) at wavelengths below the fundamental optical absorption edge is an unexpected and unusual phenomenon.

In the drawings:

FIG. 1 is a partially perspective, partially schematic view of a photoconductive device of the invention.

FIG. 2 is a front elevation view of apparatus useful in preparing bodies of $Cd_4SiS_6$ or $Cd_4SiSe_6$ employed in the novel devices described herein.

FIG. 3 is a graph showing the wavelength dependence of photocurrent for devices utilizing annealed and unannealed $Cd_4SiS_6$ crystals.

The novel photoconductive devices disclosed herein include a photoconductive body of $Cd_4SiS_6$ or $Cd_4SiSe_6$. Bodies of $Cd_4SiS_6$ and $Cd_4SiSe_6$, have been found to be photosensitive in the ranges of about 2000 A. to 4700 A. and 4000 A. to 7000 A. respectively.

FIGURE 1 illustrates a novel photoconductive device 20. The device 20 is comprised of a rectangularly shaped photoconductive body 21, cut from a $Cd_4SiS_6$ single crystal and having a surface area of a few square millimeters. Evaporated indium electrodes 22 and 23 are disposed in spaced positions on the photoconductive body 21 and are in ohmic contact therewith. The electrodes 22 and 23 provide means for applying a voltage to the photoconductive body 21 between the electrodes 22 and 23.

The photoconductive device 20 may be used, for instance, in a circuit as shown in FIGURE 1. Here, leads 24 and 25 are connected to the electrodes 22 and 23 respectively by means of conductive silver epoxy cement. A battery 26 and a load impedance 27 which may, for instance, be a relay, are connected in series with the device 20 between the leads 24 and 25.

In operation, when no light falls on the photoconductive body 21, the photoconductive device 20 is in a high impedance state. While in this state the voltage drop appears essentially across the device 20, and the current flowing through the load impedance 27 is small due to the high impedance of the device 20. When light of the proper wavelength (2000 A. to 4700 A. for $Cd_4SiS_6$ crystals) is incident on the photoconductive body 21, the impedance of the device 20 drops to a lower value, allowing a higher current to pass through the load impedance 27 and causing a greater voltage drop to appear thereacross.

A typical device 20 has a 0.6 mm. gap between the electrodes 22 and 23, which electrodes are supported on a crystal having a cross sectional area of 0.2 mm.$^2$ (1 mm. wide and 0.2 mm. thick). This typical device shows a dark resistance of $10^{11}$ ohms. Under illumination with essentially monochromatic light of about 3600 A. and an intensity of about $10^{12}$ quanta/cm.$^2$-sec. (or approximately $5.5 \times 10^{-7}$ watts/cm.$^2$), the resistance of the typical device is about $3 \times 10^8$ ohms.

The embodiment shown in FIGURE 1 is but one example of the novel device. The novel materials, $Cd_4SiS_6$ and $Cd_4SiSe_6$, can substitute for other photoconductive materials in previous or future photoconductive device structures. The uses for the novel device include, but are not limited to, light meters, vidicon tubes, light amplifiers, image converters, shift registers and temperature detectors and controllers.

The photoconductive body 21 in the device can be in any of several forms, e.g. single crystals, sintered powders, sintered crystals, or powdered or crystalline material held in a binder.

In many device applications, the photoconductive body 21 is in the form of a layer supported on a substrate (not shown). The type of substrate employed, if any, depends on the device application. In a vidicon tube, the substrate is of a transparent insulating material having a transparent conductive coating on one side thereof and a layer of the photoconductive body 21 disposed on the conductive coating and in electric contact therewith. In a typical light amplifier or image converter wherein a photoconductive body is used in conjunction with an electroluminescent body, the photoconductive body is generally in the form of a layer on a substrate having a transparent conductive coating. Alternatively, it can be disposed on the electroluminescent layer which layer is disposed on a transparent substrate having transparent electrodes thereon. In general, any arrangement is possible as long as the photoconductive body can be illuminated by radiation in the wavelength region in which the body is photosensitive, and a voltage can be created across the photoconductor by means of at least one electrode in contact therewith.

Examples of electrode materials that may be used with $Cd_4SiS_6$ and $Cd_4SiSe_6$ photoconductive bodies to give ohmic contacts include silver, cadmium, indium, gallium and aluminum metals. The preferred method of applying the metallic electrodes in forming the device 20 is by vacuum evaporation. Electrodes on $Cd_4SiS_6$ or $Cd_4SiSe_6$ are not necessarily limited to metals or to the specific metals cited herein. Some crystals of the photoconductive body grown in an iodine atmosphere are covered with an insulating surface layer which must be removed prior to electrode deposition. This can be done by washing the crystals immediately after they are removed from the reaction tube in which they are formed, first with hot hexane and then with ethanol. Alternatively, the insulating layer can be removed by mechanically grinding the crystal surface.

In general $Cd_4SiS_6$ powder is prepared by reacting stoichiometric quantities of cadmium sulfide, elemental silicon and elemental sulfur in a closed evacuated reaction vessel. Alternatively, $Cd_4SiS_6$ powder can be prepared by reacting stoichiometric quantities of cadmium metal, elemental silicon and elemental sulfur. However, the former reactions are preferable for reasons of higher reaction velocity and completeness of reaction. The powdered material is not an efficient ultraviolet sensitive photoconductor.

In order to produce single crystal $Cd_4SiS_6$ crystal growth occurs in the presence of iodine by an iodine transport process. The reactants cited above can be interacted with the absence of iodine so as to form a powdered product which powder can then be placed in an iodine atmosphere for the growth of single crystals, or the initial reaction can take place in the presence of iodine vapor so as to yield a crystalline product directly. Crystalline $Cd_4SiS_6$ grown by this method is an efficient ultra violet photoconductor. $Cd_4SiSe_6$ crystals are similarly prepared from cadmium selenide, elemental silicon and elemental selenium or cadmium metal, elemental silicon and elemental selenium.

Crystals of $Cd_4SiS_6$ or $Cr_4SiSe_6$ can be grown using an apparatus of the type shown in FIGURE 2. The apparatus consists of a quartz reaction vessel 31 in which crystal growth takes place. The quartz reaction vessel 31 has a tapered end portion 32. One end of a quartz Tee tube 33 is sealed to the quartz reaction vessel 31 opposite the tapered portion 32. Another end of the Tee tube 33, which is at a right angle with the end connected to the reaction vessel 31, is sealed to an iodine supply tube 34. The iodine supply tube 34 contains iodine in a sealed ampoule 35 at its lower end. A magnetic hammer 36, disposed in the upper end of the tube 34, when caused to fall on the iodine ampoule 35, will break the ampoule 35, thereby making the iodine therein available for reaction. The iodine supply tube 34 is closed at both ends so as to hold a vacuum. The third end of the Tee tube 33 is connected to a vacuum pump (not shown). Using this apparatus, single crystals of $Cd_4SiS_6$ can be grown by the following procedure.

EXAMPLE 1

The reactants 37 are placed in the quartz reaction vessel 31 and the apparatus is evacuated to about $10^{-5}$ torr. If the starting material is previously prepared $Cd_4SiS_6$ powder, then it is baked at 200° C. for about one hour to remove absorbed gases and water vapor. The system is then sealed off at A—A and the reaction vessel 31 is cooled to liquid nitrogen temperature. The iodine ampoule 35 is broken with the magnetic hammer 36 and the iodine is transferred to the reaction vessel by distilling it with a torch. The reaction vessel 31 is then sealed off at B—B and put in a furnace having a temperature gradient such that the tapered end 32 is hotter than the reactants 37. This destroys nucleation centers at the tip of the tapered end 32. The temperature profile is then changed so that the tip is cooler than the reactants, the tube remains in this condition until the yellowish crystals which are formed at the tip of the reaction vessel 31 reaches the desired size. These crystals can then be used in the fabrication of ultraviolet photosensitive devices. Crystals of $Cd_4SiS_6$ of up to $10 \times 5 \times 6$ mm.³ in size were grown by this technique.

Crystal growth is carried out at temperatures ranging from about 750° C. to about 900° C. with a temperature gradient from the tip of the tapered end portion 32 of the reaction vessel 31 to the reactants of from about 5° C. to about 35° C. The reactants 37 are held at a higher temperature than the tapered end 32 of the reaction vessel 31 which acts as, or can contain, the substrate upon which the crystals form. The reaction time varies from about one to ten days. Preferably, the reaction is carried out at a tapered end 32, temperature of about 800° C. and a temperature gradient of about 15° C., over a period of 5 days.

The reactants 37 can be either previously prepared $Cd_4SiS_6$ powder, stoichiometric quantities of cadmium sulfide, elemental silicon and elemental sulfur or stoichiometric quantities of cadmium metal, elemental silicon and elemental sulfur. It is preferable that iodine be present throughout the reaction when the starting materials are elemental cadmium, silicon, and sulfur. However, when the starting materials are cadmium sulfide and elemental silicon and sulfur, then it is preferable that the iodine be admitted to the reaction vessel 31 after these materials have combined to form $Cd_4SiS_6$ powder. $Cd_4SiS_6$ powder can be prepared by reacting stoichiometric amounts of cadmium sulfide, elemental silicon and elemental sulfur in an evacuated reaction vessel at about 850° C. for about 2 days. A slow heating rate is preferable so as to avoid explosions. The product of this reaction is in the form of a greenish powder.

The exact pressure of the reaction is not critical so long as a substantial vacuum is reached so that oxygen and water vapor are essentially removed.

The iodine used is preferably of high purity (e.g. 99.998%) and the concentration of iodine used is preferably about 4 mg./cm.³ where the volume (cm.³) refers to the volume of the reaction vessel 31. This concentration is not critical and extremely wide variations in iodine concentration can be used.

EXAMPLE 2

Black $Cd_4SiSe_6$ crystals or powder can be prepared in the same manner as $Cd_4SiS_6$, by the procedure given in Example 1, except the reactants 37 are cadmium selenide, elemental silicon and elemental selenium or cadmium metal, elemental silicon and elemental selenium.

EXAMPLE 3

Sintered plates of $Cd_4SiS_6$ can be prepared by charging a quartz ampoule with $Cd_4SiS_6$ powder and iodine (~4 mg./cc.) and placing the ampoule in a temperature gradient of from about 50° C. to 200° C. and an average temperature of about 800° C. for about two days. The powder thus becomes sintered into a hard plate, the lower surface of which recrystallizes and becomes very smooth. These plates can then be provided with electrodes and mounted for device application.

EXAMPLE 4

The crystalline or powdered $Cd_4SiS_6$ or $Cd_4SiSe_6$ prepared as in prior examples can be held in a binder, as is known in the photoconductor art, for purposes of device fabrication. Also, the reaction may be carried out in a reaction vessel having a substrate that can be employed in the fabrication of a photosensitive device.

The photoresponse of $Cd_4SiS_6$ crystals may be altered by annealing. The change in response varies with annealing temperature and atmosphere. Dark conductivity can also be affected by annealing.

FIGURE 3 includes graphs of photocurrent, $J_{ph}$, in amperes versus wavelength of incident light in angstrom units for unannealed $Cd_4SiS_6$ crystals (curve X), $Cd_4SiS_6$ crystals annealed in hydrogen at 300° C. for 30 minutes (curve Y) and for $Cd_4SiS_6$ crystals annealed in air at 500° C. for 30 minutes (curve Z).

The photocurrent $j_{ph}$ is corrected for equal numbers of incident photons under the assumption that the photocurrent is proportional to the light intensity.

The fundamental optical absorption edge of $Cd_4SiS_6$, as determined by spectroscopic measurements, is at about 4300 A. (3.03 ev.). The curve X of unannealed single crystal $Cd_4SiS_6$ includes an anomolous increase in photocurrent within the fundamental optical absorption region. This effect, which is unusual and unexpected occurs in the near ultraviolet (2000 A.–4000 A.) region of the spectrum.

While the anomolous photoconductivity in the range 2000 A.–4000 A. is not understood it is believed that this property is due to a surface layer. This layer may be a silicon oxide layer represented by the formula $SiO_{2-x}$, where X is greater than zero and less than one, such that the higher the ratio of Si to O the higher the absorption coefficient of the layer in the wavelength region around 3000 A. The photoconductivity peak around 5000 A., though not fully understood, may be due to impurity photoconduction of unintentionally added impurities in the intrinsic material.

Typical values for the photoconductivity of intrinsic unannealed n-type $Cd_4SiS_6$ crystals at 4100 A. with a light intensity of $10^{12}$ quanta/cm.$^2$ sec. lie between about $10^{-6}$ and $10^{-7}$ $(\Omega cm.)^{-1}$. At 3000 A. for the same light intensity the photoconductivity is in the range between about $10^{-7}$ $(\Omega cm.)^{-1}$ to $10^{-5}$ $(\Omega cm.)^{-1}$. The dark conductivity of the crystals is generally between about $10^{-12}$ $(\Omega cm.)^{-1}$ and $10^{-10}$ $(\Omega cm.)^{-1}$. Photoconductivity, as used herein, is the difference btween light conductivity and dark conductivity.

The dark conductivity of $Cd_4SiSe_6$ is about the same as that of $Cd_4SiS_6$. The photoconductivity of the $Cd_4SiSe_6$ reaches values of about $3 \times 10^{-5}$ $(\Omega cm.)^{-1}$. Both $Cd_4SiS_6$ and $Cd_4SiSe_6$ have sensitivities of about $10^{-2}$ mho cm.$^2$/watt, where sensitivity is defined as the photoconductance times the square of the electrode spacing divided by the absorbed power.

$Cd_4SiS_6$ irradiated with ultra violet light (~3600 A.) has been found to be an efficient red phosphor at liquid nitrogen temperatures. $Cd_4SiS_6$ doped with various elements, for example, Cu, Ag, Hg, Mn, Ga, In, Tl, Nb, Eu, U, and As, has been produced Copper doped $Cd_4SiS_6$, produced, for example, by adding Cu metal or CuI to the starting materials, is an efficient red emitting phosphor at room temperature. This doped material also exhibits photoconduction from 4400 A. to 6200 A. with a peak photoconductivity of $4 \times 10^{-4}$ $(\Omega cm.)^{-1}$ and $4 \times 10^{-5}$ $(\Omega cm.)^{-1}$, respectively.

What is claimed is:

1. A photoconductive device comprises a body consisting essentially of at least one material selected from the group consisting of $Cd_4SiS_6$ and $Cd_4SiSe_6$, and at least one electrode in contact with said body.

2. The device defined in claim 1 wherein the body consists essentially of $Cd_4SiSe_6$.

3. The device described in claim 1 wherein the body consists essentially of $Cd_4SiS_6$.

4. An ultraviolet sensitive photoconductive device of the type described in claim 3 wherein said body consists essentially of at least one $Cd_4SiS_6$ crystal, said crystal having been grown in an iodine atmosphere.

5. A method for preparing photoconductive crystalline $Cd_4SiS_6$ including the step of reacting essentially stoichiometric quantities of elemental cadmium, elemental silicon, and elemental sulfur in an iodine atmosphere so as to produce said $Cd_4SiS_6$ crystal.

6. The method for preparing crystalline $Cd_4SiS_6$ recited in claim 5, wherein essentially stoichiometric quantities of cadmium sulfide, elemental silicon and elemental sulfur are first reacted together to produce a $Cd_4SiS_6$ reaction product and then crystals of said $Cd_4SiS_6$ are grown from said reaction product by vapor transport in an iodine atmosphere.

7. The process for growing $Cd_4SiS_6$ crystals recited in claim 6 wherein the step of growing said crystals is carried out in a closed reaction vessel at a temperature of about 775° C. to 875° C. and a growth time of from about 1 to 10 days, said reaction vessel having a temperature gradient of about 5° C. to 35° C. such that vapors formed at the hotter portion of the vessel condense to form said $Cd_4SiS_6$ crystals at the cooler portion of the vessel.

References Cited

UNITED STATES PATENTS

| 3,104,229 | 9/1963 | Koelmans et al. | 252—301.65 |
| 3,174,939 | 3/1965 | Suchow | 252—301.65 |

LEON D. ROSDOL, Primary Examiner

J. D. WELSH, Assistant Examiner

U.S. Cl. X.R.

23—50, 114; 252—501